United States Patent [19]

Darby

[11] 4,412,828
[45] Nov. 1, 1983

[54] CONTROL MEANS FOR SHIFTING GEARS ON DUAL SHIFT BICYCLES

[76] Inventor: Jack B. Darby, 302 Bunker Hill Rd., Harleysville, Pa. 19438

[21] Appl. No.: 261,576

[22] Filed: May 7, 1981

[51] Int. Cl.³ .................. F16H 9/00; F16H 11/00; B60K 20/00; G05G 9/00
[52] U.S. Cl. .................. 474/81; 474/78; 474/80; 74/471 R; 74/473 R; 74/475
[58] Field of Search .............. 474/78, 80, 81; 74/471 R, 473 R, 475

[56] References Cited

U.S. PATENT DOCUMENTS

| | | | |
|---|---|---|---|
| 3,121,575 | 2/1964 | Bourgi | 474/72 X |
| 3,406,587 | 10/1968 | Brilando et al. | 74/475 |
| 3,742,777 | 7/1973 | Mathauser | 474/81 |
| 3,901,095 | 8/1975 | Wechsler | 474/81 |
| 3,965,763 | 6/1976 | Wechsler | 474/81 |
| 4,055,093 | 10/1977 | Ross | 474/81 X |
| 4,143,557 | 3/1979 | Wakebe et al. | 474/80 |
| 4,194,408 | 3/1980 | Hedrich | 474/81 |
| 4,201,095 | 5/1980 | Cirami | 74/471 R |
| 4,232,564 | 11/1980 | Yamasaki | 74/475 |
| 4,270,402 | 6/1981 | Nagano | 74/471 R |
| 4,376,394 | 3/1983 | Lapeyre | 74/750 B |

FOREIGN PATENT DOCUMENTS

| | | | |
|---|---|---|---|
| 2424179 | 4/1979 | France | 74/473 R |
| 1395224 | 5/1975 | United Kingdom | 74/473 R |

*Primary Examiner*—Leslie A. Braun
*Assistant Examiner*—L. D. Shannon, III
*Attorney, Agent, or Firm*—Joseph W. Molasky & Assoc.

[57] ABSTRACT

An easy to operate control means for shifting gears on dual shift bicycles is described. The control means is constructed so that the front and rear derailleurs of a dual shift bicycle are controlled together to shift to any selected gear from any engaged gear with a single operator action. The design permits the operator to preselect the new gear to be used while continuously pedaling in the present gear, with the actual gear change being made at the operator's discretion. The design also facilitates a rapid series of up shifts or down shifts without requiring intervening gear selections.

30 Claims, 21 Drawing Figures

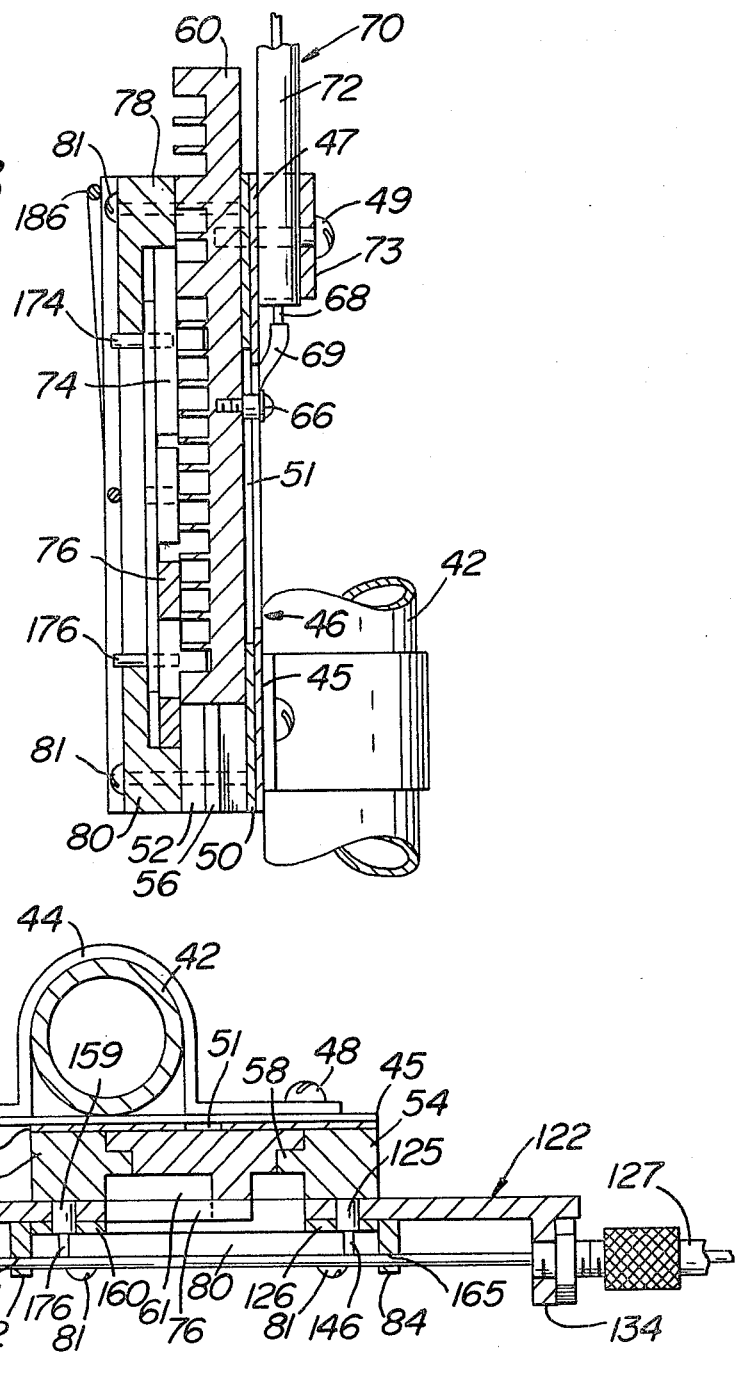

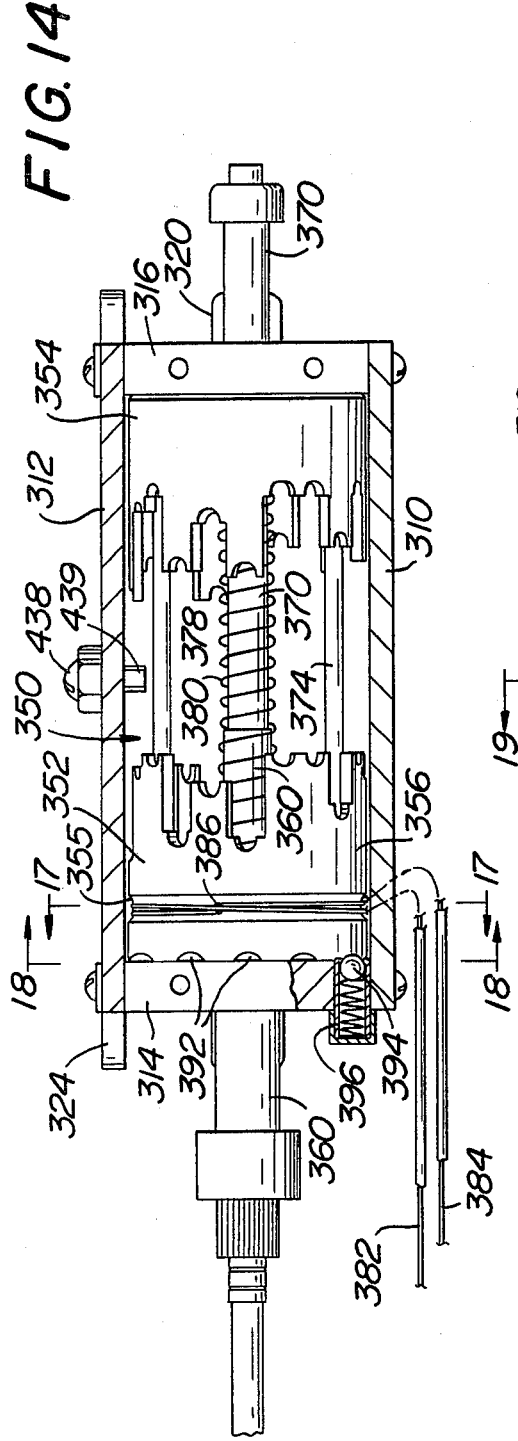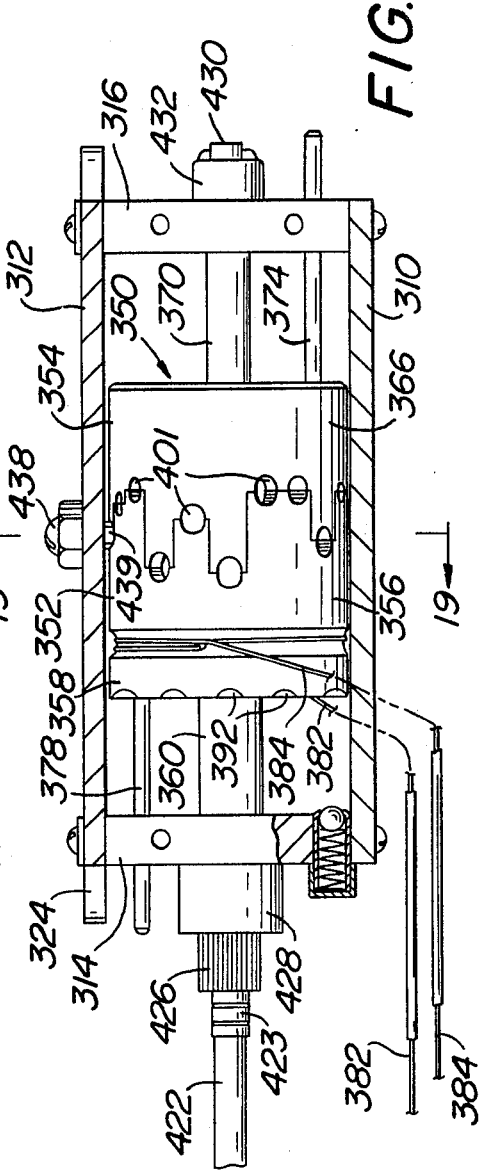

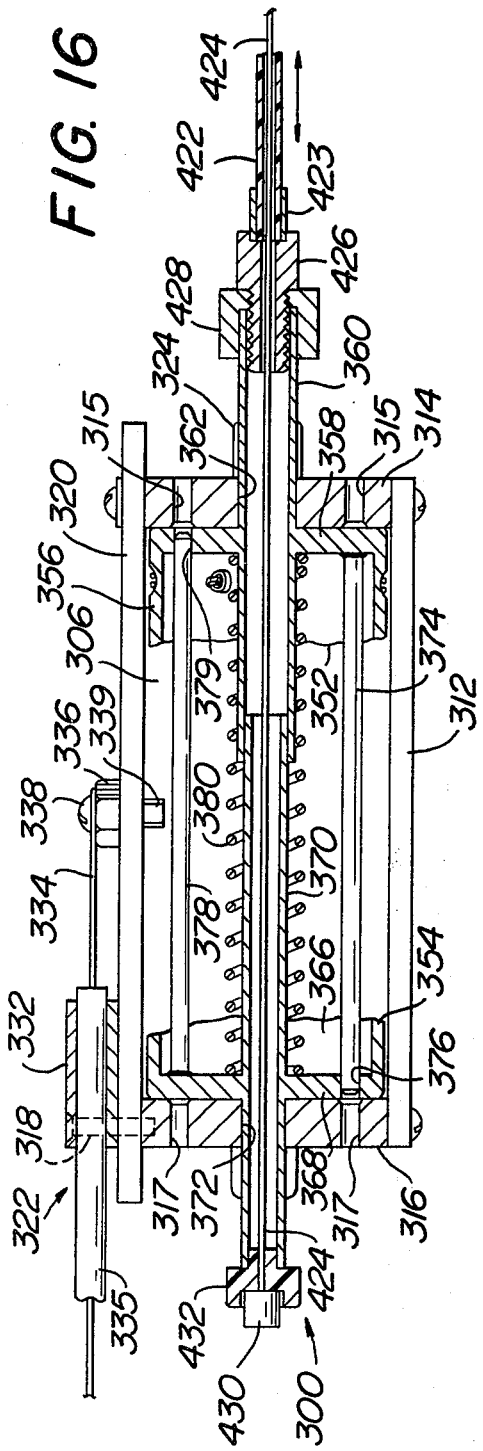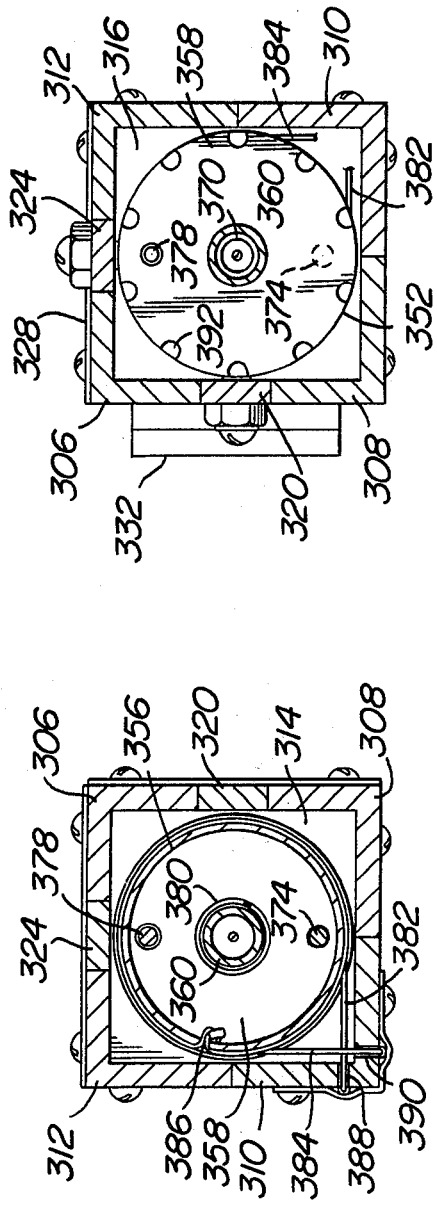

CONTROL MEANS FOR SHIFTING GEARS ON DUAL SHIFT BICYCLES

BACKGROUND AND SUMMARY OF THE INVENTION

The present invention relates to an improvement in means for shifting gears on dual shift bicycles, i.e., bicycles having two sets of sprocket clusters and means for shifting the drive chain between the sprockets thereof. Such bicycles generally are designed to operate at various gear ratios (speeds), such as 10, 12, 15 etc.

The present day dual shift bicycles have two shift handles, one for each of the front and rear derailleur mechanisms, and are cumbersome and difficult to operate. The two handles are interactive and must be manipulated in a manner that is beyond the knowledge and skill of the average operator (bike rider). The bike rider must operate either or both of the gear selection handles in order to shift the bicycle to the desired gear ratio. The two handles must be adjusted further after the shift is completed, such further adjustment generally being made by ear while listening for rubbing and/or grinding of the drive chain. It is extremely difficult for the operator to remember which handle or handles are to be operated to place the gear shift in the desired one of the ten different gear ratios and the operator must also consider whether he is shifting up or down and remember which gear he is in prior to the shifting operation.

Various attempts have been made to overcome the above-discussed problems in the dual shift bicycles in general use today. For example, U.S. Pat. Nos. 4,055,093; 3,965,763; and 3,901,095 disclose attempts at overcoming the above-described problems. U.S. Pat. No. 4,055,093 discloses a control for a ten speed bicycle comprising a single manually movable control member associated with a pair of cams for actuating the front and rear derailleurs. U.S. Pat. Nos. 3,965,763 and 3,901,095 disclose gear shifts for dual shift bicycles in which a single continuous cable is actuated to control cams which actuate the front and rear derailleurs. Prior art U.S. Pat. No. 3,121,575 is also acknowledged.

The above-described prior art patents do not provide a practical solution to the problems of the present day dual shift bicycles in use. The device disclosed in U.S. Pat. No. 4,055,093, for example, requires the shifting back and forth of the derailleurs for intermediate gears with the mechanism going sequentially through each gear each time a gear shift is made.

In accordance with the present invention there is provided a control means for shifting gears on dual shift bicycles that is easy to operate and applicable for the shifting of gears on all dual shift bicycles. The control means of the present invention is constructed so that the front and rear derailleurs are controlled together to shift to any selected gear from any engaged gear with a single operator action. Accordingly, the operator need not concern himself with which one or both of the derailleurs is to be shifted, which direction to shift the derailleurs, or how much the derailleurs are to be shifted.

In accordance with the invention there is provided a pre-select feature that allows the operator to anticipate and select the next gear change while continuously pedaling in the present gear. The actual gear change can be postponed by the operator indefinitely or can be overridden by a different subsequent selection if desired.

Furthermore, the control means of the present invention operates to directly position both front and rear derailleurs for the selected gear without any back and forth shifting for intermediate gears. This allows for the fastest possible shift between any two gears. A feature of the control means in accordance with the invention is that shifting can take place with both hands of the operator (bicycle rider) on the handle bars to provide increased safety and better control.

Furthermore, the control means is designed so that when shifting between two gears that engage the same sprocket of the sprocket cluster associated with the front derailleur (ie., either the large or small sprocket), the mechanism is precisely positioned to avoid the occurrence of rubbing as a result of a new rear sprocket selection.

Also, the selection and control means are designed to facilitate a rapid series of up shifts or down shifts. (Rapid down shifting, for example, as needed for efficient hill climbing.) Such a series of up shifts or down shifts can be made without intervening gear selections between shifts.

In the achievement of the above-described ends, the mechanism of the present invention will indicate the gear presently engaged or preselected by the operator, ie., gear ratios (speeds) 1–10 for a ten speed bicycle, and provide for simple, error free shifting into any selected higher or lower gear. The bicycle rider need not be concerned with calculating or memorizing any shifting sequence.

BRIEF DESCRIPTION OF THE DRAWINGS

FIG. 3 is a sectional view taken generally on line 3—3 of FIG. 2;

FIG. 4 is a sectional view taken generally on line 4—4 of FIG. 2;

FIGS. 14 and 15 are views showing the shifter assembly shown in FIG. 13 in the non-actuated and actuated positions thereof;

FIG. 16 is a section taken on line 16—16 of FIG. 13;

FIG. 17 is a section taken on line 17—17 of FIG. 14;
FIG. 18 is a section taken on line 18—18 of FIG. 14.

DETAILED DESCRIPTION OF THE PREFERRED EMBODIMENT

Figure 1:
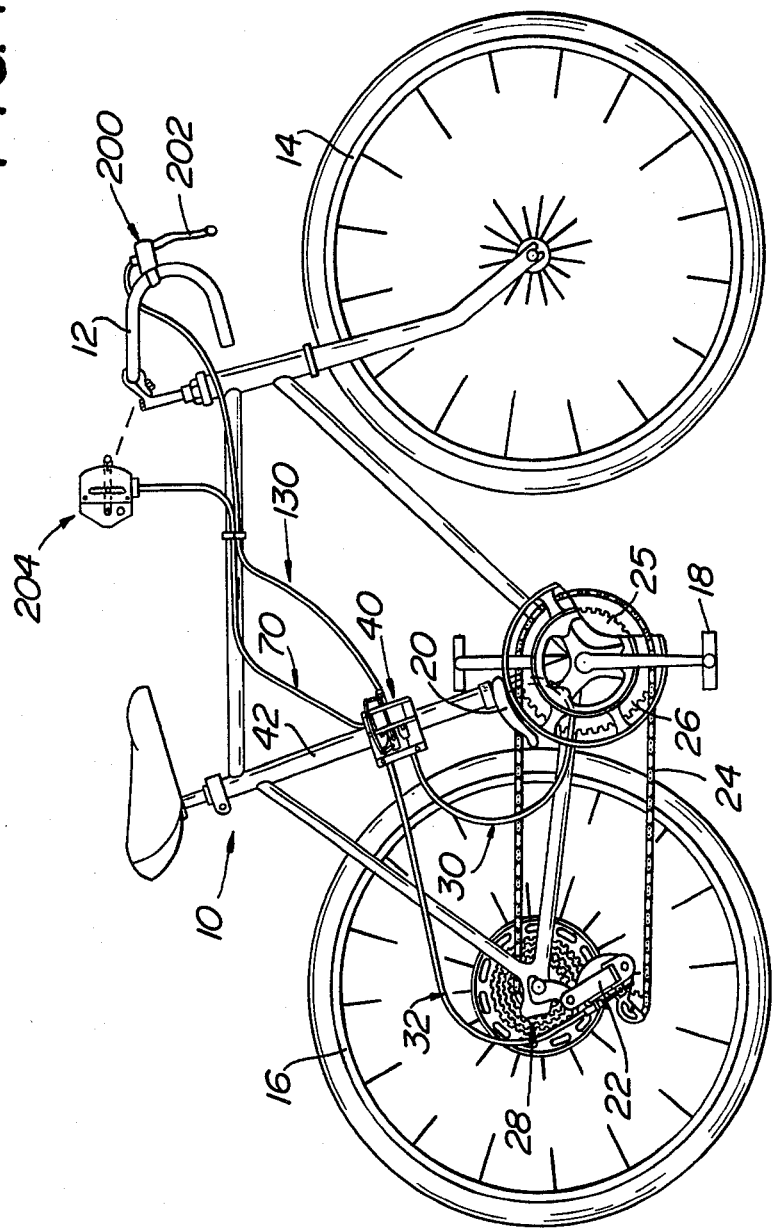
FIG. 1 is a side elevational view of a ten speed bicycle provided with the shift control mechanism in accordance with the invention.

Referring first to FIG. 1, there is shown a generally conventional ten speed bicycle comprised of a frame indicated generally at 10 onto which are mounted handle bars 12, a front wheel 14, a rear wheel 16, and pedals 18. There is also provided a front derailleur 20 and a rear derailleur 22. As is conventional, the front derailleur 20 is constructed and arranged to shift a drive chain 24 to either of two sprockets 25 and 26 of a front sprocket cluster and the rear derailleur 22 is constructed and arranged to shift chain 24 into engagement with any one of the five sprockets of the rear sprocket cluster indicated at 28. In the conventional two-handle shifting mechanisms in use today, the shifting is provided by a pair of hand shift levers on the handle bar or bike frame which move actuating cables which extend from the levers to be associated front or rear derailleur. Cable means corresponding to the lower portion of the cable means in the prior art are indicated at 30 and 32 in FIG. 1.

The above-described mechanism is conventional in the art and operates to shift the bicycle to any of its ten gears by actuation of the cable means 30 and 32.

In order to accommodate the shift mechanism in accordance with the invention, cable means 30 and 32 are constructed with a solid (not stranded) center wire that transmits motion by both pushing and pulling. The sheaths of cable means 30 and 32 must therefore be attached to the derailleurs via suitable immobilizing connectors. In addition the return springs of both the front and rear derailleurs must be removed or made inoperative. The "Positron II" rear derailleur manufactured by Shimano, is suitable without modification. The Shimano "ALTUS" front derailleur is usable by disabling the return spring and providing a suitable connector whereby the sheath is immobilized and the solid center wire is pivotally connected to the derailleur actuating mechanism. With the exception of the minor variations described above, the derailleur mechanisms are identical to the basic gear shifting mechanisms in use today. The invention relates to the shifting means for positioning these front and rear derailleurs.

The shifting means in accordance with the invention shown in FIGS. 1-7 comprises a shifter assembly 40 mounted on bicycle frame member 42 by a clamp 44 (FIG. 4) secured to a leg 45 of a mounting member 46 of shifter assembly 40 by means of mounting screws 48. A bottom plate 50 is secured to mounting member 46 by a plurality of mounting screws 49 and has a pair of elongated selector guides 52 and 54 pinned thereto. Selector guides 52 and 54 have guideways 56 and 58 facing each other. A selector 60 has recesses 57 and 59 cooperable with guideways 56 and 58, respectively, and is arranged to be guided for sliding movement thereon.

Figure 6:
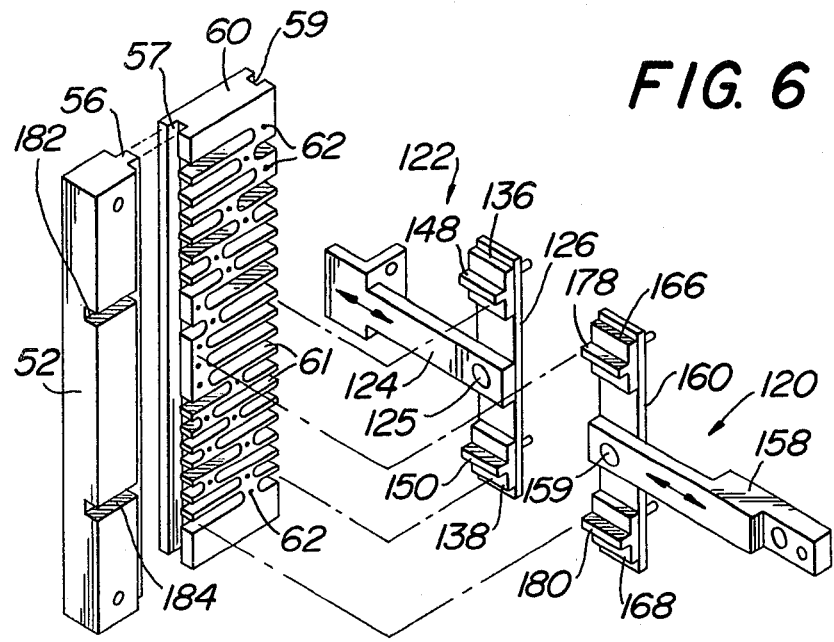
FIG. 6 is an exploded view of the slide mechanism and the linkage means cooperating therewith used in the control means in accordance with the invention.

As is best shown in FIG. 6, selector 60 is provided with twenty transversely extending slots 61 spaced equally along the length thereof. As viewed in FIG. 6, the uppermost ten slots 61 are associated with the rear derailleur and the lowermost ten slots 61 are associated with the front derailleur. Each of the twenty slots 61 is provided with an embedded stop which defines a reference point, indicated by dots 62, in the center thereof. As will be described more fully hereafter, there are provided two reference points (one associated with each derailleur) for each of the ten gear ratios (speeds) of the bicycle.

Means are provided for moving selector 60 to various selecting positions along the length of selector guides 52 and 54. To this end, there is provided an elongated slot 51 in bottom plate 50. A screw 66 threadedly engaged in the back of selector 60 extends within slot 51 and is engaged at its extended end with the wire 68 of a selector cable assembly 70 by means of a connector 69 (FIG. 3). The selector cable assembly 70 comprises wire 68 and a sheath 72 which, as shown in FIG. 3, has its end immobilized by being clamped between bottom plate 50 and a clamp forming portion 73 of a leg 47 of mounting member 46. The movement of selector 60 by cable assembly 70 will be described more fully hereafter.

The shifting means in accordance with the invention also comprises a control means operatively engaged with the derailleur cable means 30 and 32 for positioning the derailleurs. Such control means comprises a rear control slide 74 associated with rear derailleur cable means 32 and a front control slide 76 associated with front derailleur cable means 30. Control slides 74 and 76 are slidably mounted within shifter assembly 40 for movement transversely of selector 60 across slots 61. To this end, control slides 74 and 76 have a generally rectangular configuration and have centrally located guide slots 75 and 77, respectively. Control slides 74 and 76 are located for movement in the space between a pair of top covers 78 and 80 and guide 52 (FIGS. 3 and 4). Four mounting screws 81 extend through holes in top covers 78 and 80 into threaded engagement with threaded holes in guides 52 and 54 to secure these parts together. A pair of side plates 82 and 84 are secured to top covers 78 and 80 by mounting screws 83 and 85, respectively.

Figure 5:
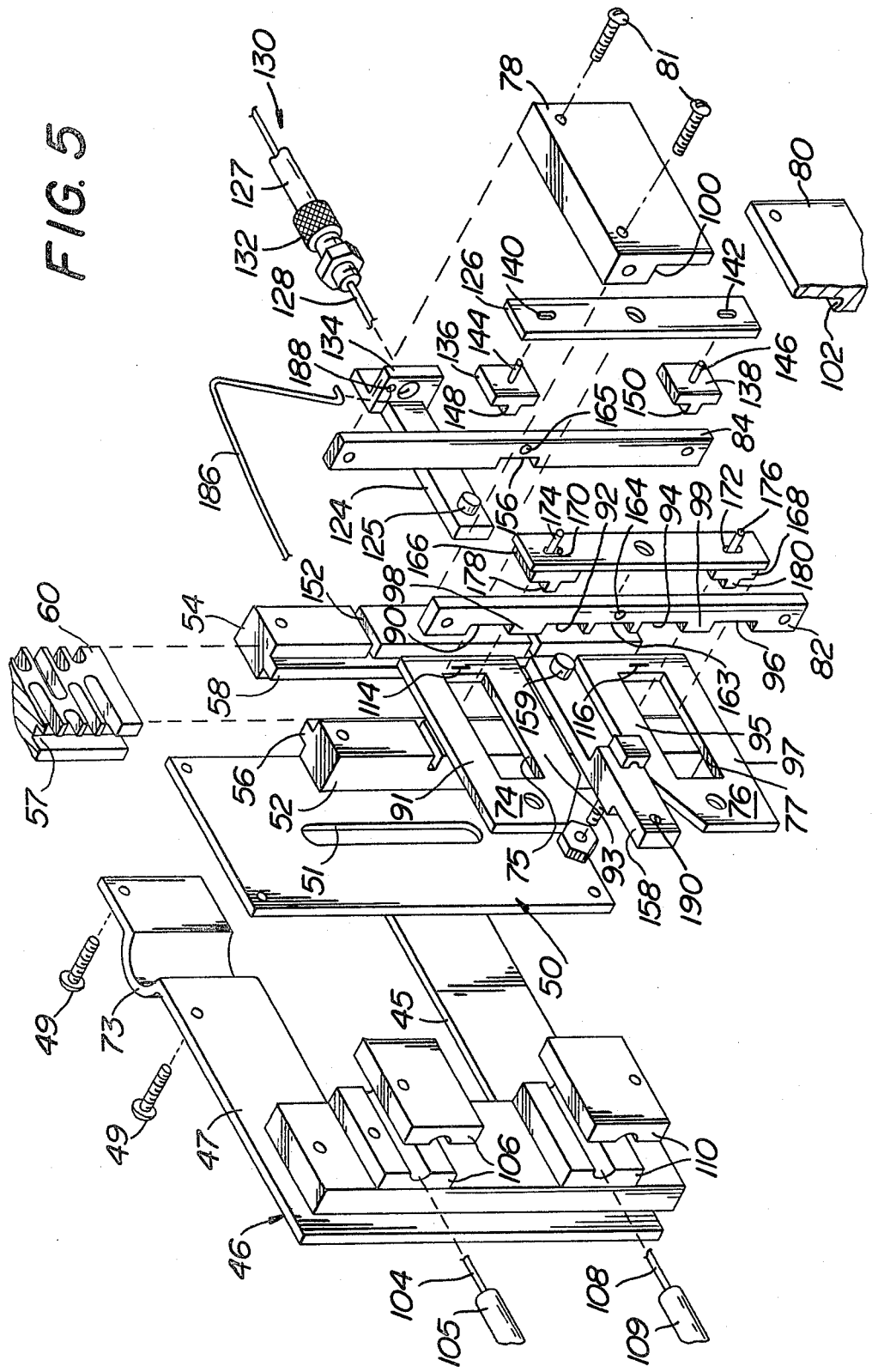
FIG. 5 is an exploded view of the part of the shifter assembly shown on the lower portion of FIG. 2.

Means are provided for guiding control slides 74 and 76 for movement in a generally linear path transverse to selector 60. To this end, side plate 82 is provided with a pair of upper recesses 90 and 92 for slidably receiving the longitudinal leg portions 91 and 93, respectively, of control slide 74, and a pair of lower recesses 94 and 96 for slidably receiving longitudinal leg portions 95 and 97 of control slide 76. The portion 98 of side plate 82 between the upper recesses 90 and 92 extends into the slot 75 of control slide 74 and the portion 99 of side plate 76 between the lower recesses 94 and 96 extends into the slot 77 of control slide 76, as is best shown in FIG. 5. The upper edge of control slide 74 also slidably contacts a guide wall 100 of top cover 78 and the lower edge of control slide 76 slidably contacts a guide wall 102 of top cover 80 for guiding the linear movement of control slides 74 and 76.

Figure 2:
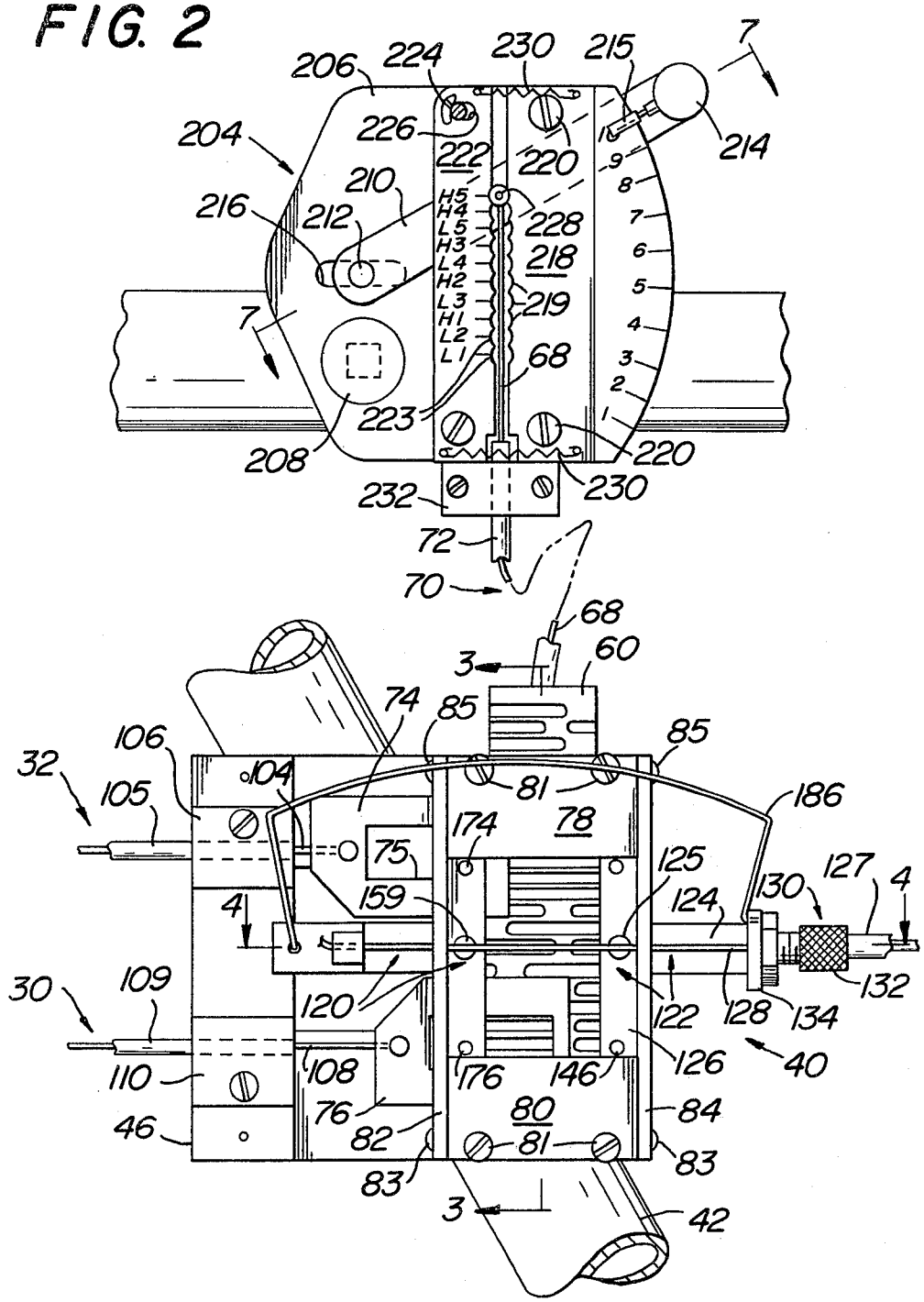
FIG. 2 is a view showing the speed selector means and shifter assembly incorporated in the bicycle shown in FIG. 1.

Referring to FIG. 2, the left end of control slide 74 is connected to the wire 104 of rear cable means 32 by a suitable connector. The sheath 105 of cable means 32 is clamped in a fixed position by sheath clamps 106 mounted on mounting member 46 as is apparent from a consideration of FIGS. 2 and 5. Referring to FIG. 2, the left end of control slide 76 is secured to the wire 108 of cable means 30 by a suitable connector and the sheath 109 of cable means 30 is secured in a fixed position by means of sheath clamps 110 mounted on mounting member 46. By this arrangement, the linear movement of the control slides 74 and 76 causes a corresponding movement of the wires 104 and 108, respectively, secured thereto. The movement of wires 104 and 108 causes the positioning of the derailleur mechanisms 22 and 20, respectively, as is conventional in the art, to position drive chain 24 for engagement with a corresponding sprocket.

For a purpose to be described hereafter, the control slides 74 and 76 have indicated thereon reference lines 114 and 116, respectively, on the end legs thereof as is best shown in FIG. 5. It is the alignment of these reference lines 114 and 116 with the reference points indicated by dots 62 on selector slide 60 that determines the position of the front and rear derailleurs.

The shifting means in accordance with the invention is provided with an actuating means operatively engageable with control slides 74 and 76 of the control means for actuating the same into positions corresponding to the reference points of selector 60. Thus, the shifting movement of control slides 74 and 76 to the control positions thereof by the actuating means causes a corresponding movement of the front and rear shift cable means 30 and 32 to place the front and rear derailleurs 20 and 22 in a desired shifting position. Such means comprises a sheath linkage assembly 122 and a wire linkage assembly 120.

Sheath linkage assembly 122 comprises a sheath engaging member 124 and an actuator member 126. One end of member 124 is connected to a sheath 127 of an actuator cable assembly 130 and the other end of member 124 has member 126 pivotally mounted thereon at pivot 125. Sheath 127 is connected to member 124 by a conventional connector 132 which threadedly engages a lug 134 on member 124.

A pair of actuator slides 136 and 138 are pivotally mounted in elongated holes 140 and 142 in member 126 by means of pivot pins 144 and 146, respectively. Actuator slides 136 and 138 are rectangular and have guides 148 and 150, respectively, projecting therefrom. Guides 148 and 150 are slidably received in transverse slots 152 and 154 in selector guide 54 and are adapted for sliding movement within slots 61 in selector 60.

It is noted that sheath engaging member 124 is guided for movement transversely of selector 60 by a cutout 156 in side plate 84. Cutout 156 is constructed to slidably receive member 124.

Wire linkage assembly 120 comprises a wire engaging member 158 and an actuator member 160. One end of member 158 is connected to wire 128 of actuator cable assembly 130 and the other end of member 158 has member 160 pivotally mounted thereon at pivot 159. The end of wire 128 is connected to member 158 by means of a bolt 162 secured to member 158 as shown in FIGS. 4 and 5. Wire 128 extends through aligned holes 164 and 165 in side plates 82 and 84, respectively, as this wire passes from lug 134 to bolt 162 (FIGS. 4 and 5).

It is noted that wire engaging member 158 is guided for movement transversely of selector 60 by means of a cutout 163 in side plate 82. Member 158 is slidably received in cutout 163.

A pair of actuator slides 166 and 168 are pivotally mounted in elongated holes 170 and 172 in member 160 by means of pivot pins 174 and 176, respectively. Actuator slides 166 and 168 are rectangular and have guides 178 and 180, respectively, projecting therefrom. Guides 178 and 180 are received in transverse slots 182 and 184 in selector guide 52 and are adapted for sliding movement within slots 61 in selector 60.

Actuator slides 166 and 168 are adapted to be slidably received in guide slots 75 and 77 of control slides 74 and 76, respectively. As will be described more fully hereafter, this arrangement permits actuator slides 166 and 168 to cause transverse movement of the control slides 74 and 76 across selector 60.

Means in the form of a U-shaped return spring 186 are provided for biasing sheath linkage assembly 122 and wire linkage assembly 120 to a non-actuated position in which actuator slides 136 and 138 are received in slots 152 and 154 of selector guide 54 and actuator slides 166 and 168 are received in slots 182 and 184 of selector guide 52. When the actuator slides are in this non-actuated position, the selector 60 is free to move to its selecting positions along guides 52 and 54. The ends of return springs 186 are engaged with member 124 at a hole 188 in lug 134 and are engaged with member 158 at a hole 190 therein.

Means are provided for moving wire 128 of actuator cable control assembly 130 through an actuating movement. Such means comprises an actuator lever mechanism 200 mounted on handle bars 12 as shown in FIG. 1. Lever mechanism 200 is constructed of a cable actuating lever mechanism of the type in general use today for actuating the brakes of bicycles and comprises a pivoted handle 202 having wire 128 connected thereto. In use, a pivoting movement of handle 202 causes a relative converging movement between the end of wire 128 and the end of sheath 127. Upon release of handle 202, return spring 186 functions to restore the parts in the non-actuated position shown in FIG. 2.

Figure 7:
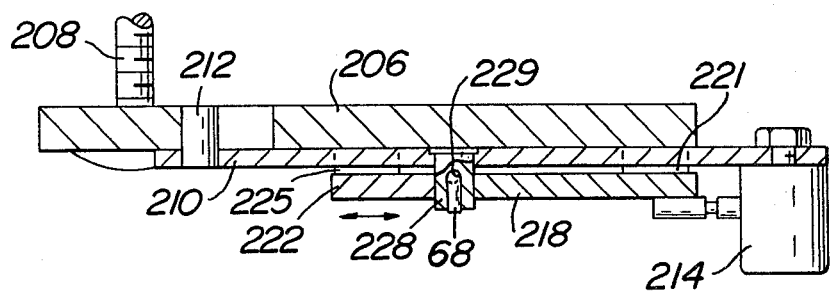
FIG. 7 is a sectional view taken generally on line 7—7 of FIG. 2.

In accordance with the embodiment of the invention shown in FIGS. 1-7, there is provided a selector positioning assembly 204 which is remotely located from shifter assembly 40. To this end, a base 206 of selector positioning assembly 204 is centrally mounted on handle bars 12 by a mounting bolt 208 and the cable assembly 70 extends from shifter assembly 40 to selector positioning assembly 204 as shown in FIGS. 1 and 2. A control lever 210 carries a pivot pin 212 at one end and has a handle knob 214 mounted on its other end as shown in FIG. 7. Pin 212 is received in an elongated cutout 216 formed in base 206 so that pin 212 can be rotated and slid within cutout 216. A face plate 218 is fixedly mounted on base 206 by a pair of screws 220 which extend through holes in face plate 218 to threadedly engage base 206. A pair of washers 221 are located on screws 220 and positioned between base 206 and plate 218. Control lever 210 extends through the space between base 206 and plate 218. Another face plate 222 is mounted on base 206 adjacent face plate 218. Face plate 222 is mounted for movement toward and away from face plate 218 by a mounting arrangement comprising a pair of screws 224 which extend through elongated cutouts 226 is face plate 222 to threadedly engage base 206. Cutouts 226 are elongated in the direction extending perpendicularly to the left edge of face plate 218 as viewed in FIG. 2. By this arrangement, face plate 222 is movable toward and away from face plate 218 to the extent of the elongation of cutouts 226. Face plate 222 is spaced from base 216 the same amount as face plate 218 by means of a pair of washers 225 mounted on screws 224. Control lever 210 extends through the space between face plate 222 and base 206.

By reason of the above-described mounting arrangement, control lever 210 is movable from the upper position shown in FIG. 2 to a lower position within the confines of face plates 218 and 222 and the mounting screws therefor. This movement, of course, will be provided by the bike rider by manually grasping knob 214 and moving the control lever 210 to various control positions to be described hereafter.

Selector positioning assembly 204 is provided with detent means for positively positioning control lever 210 in ten control positions. To this end, control lever 210 has a hollow pin 228 pivotally mounted thereon for movement therewith. Pin 228 projects perpendicularly from control lever 210 into the space between the opposing edges of plates 218 and 222 as is shown in FIGS. 2 and 7. As is shown in FIG. 2, the opposing edges of face plates 218 and 222 are each provided with ten aligned circular recesses 219 and 223, respectively. Recesses 219 and 222 are adapted to securely receive pin 228. A pair of detent springs 230 are arranged in tension and to bias plate 222 toward plate 218. Detent springs 230 function to urge plate 222 toward plate 218 so as to maintain pin 228 in any of the ten positions between any two aligned recesses 219 and 223 of plates 218 and 222. The ten positions of control lever 210 are indicated by the numbers 1–10 provided on plate 218 (FIG. 2). Control lever 210 is provided with a pointer 215 which indicates the control position control lever 210.

As shown in FIG. 2, the upper end of sheath 72 is secured in an immobilized position by means of clamping brackets 232 which are mounted on base member 206. Wire 68 extends from the upper end of sheath 72 and has its end secured to hollow pin 228 by extending through a lateral opening 229 therein. The upper end of wire 68 is turned to extend axially within the hollow cylinder 228 and is securely engaged with pin 228 by suitable means for movement therewith as control lever 210 is moved through the ten selecting positions described above.

Referring to FIGS. 2 and 3, it will be apparent that as control lever 210 is moved between its ten selecting positions, it will cause wire 68 to move relative to sheath 72 and, by reason of the connection of the lower end of wire 68 to selector 60, will cause a corresponding movement to selector 60 to ten positions corresponding to ten detented positions of control lever 210. In this manner, a remote controlling movement can be applied to selector 60 to position the same into ten selecting positions.

GENERAL DESCRIPTION OF OPERATION

The information required to select the correct front and rear derailleur positions for any selected gear (speed) (1–10) is encoded into selector 60 by means of the reference point defining stops embedded in slots 61 (FIG. 6). Selector 60 is designed for the sprocket sets of a typical twenty-seven inch ten speed bicycle. Table 1 shows for the ten gears (speeds) of the bicycle, (1) the gear ratio, which is the number of teeth on the engaged front sprocket divided by the number of teeth on the engaged rear sprocket, and (2) the gear inches, which is the gear ratio times the rear wheel diameter (27").

TABLE 1

| Front Sprockets | Large = 52 Teeth |
| | Small = 39 Teeth |
| Rear Sprockets | 1. = 28 Teeth |
| | 2. = 24 Teeth |
| | 3. = 20 Teeth |
| | 4. = 17 Teeth |
| | 5. = 14 Teeth |
| No. Teeth- Front | No. Teeth- Rear | Gear | Gear |

TABLE 1-continued

| Gear | Sprocket | Sprocket | Ratio | Inches |
|------|----------|----------|-------|--------|
| 1.   | 39       | 28       | 1.39  | 37.6   |
| 2.   | 39       | 24       | 1.63  | 43.9   |
| 3.   | 52       | 28       | 1.86  | 50.1   |
| 4.   | 39       | 20       | 1.95  | 52.7   |
| 5.   | 52       | 24       | 2.17  | 58.5   |
| 6.   | 39       | 17       | 2.29  | 61.9   |
| 7.   | 52       | 20       | 2.60  | 70.2   |
| 8.   | 39       | 14       | 2.79  | 75.2   |
| 9.   | 52       | 17       | 3.06  | 82.6   |
| 10.  | 52       | 14       | 3.71  | 100.3  |

In the first step of a gear shifting operation, selector 60 is positioned to one of ten selecting positions by operating selector positioning assembly 204 best shown in FIGS. 2 and 3. The information encoded into slots 61 of selector 60 is translated into the correct front and rear derailleur positions for the selected gear (speed) by subsequently operating lever 202 of the actuator lever mechanism 200 (FIG. 1) through an actuating movement. This actuating movement causes sheath linkage assembly 122 to be pushed and wire linkage assembly 120 to be pulled at the same time. (See FIGS. 11 and 12). Actuator slides 136, 138 and 166, 168 are thus pushed or pulled into the open slots 61 of selector 60 aligned therewith until they each in turn meet resistance by contacting either a stop imbedded in the aligned slot 61 or contacting the edge of a control slide 74 or 76. When resistance is met by one or more actuator slides 136, 138 and 166, 168, motion is transferred to the remaining actuator slides by reason of the pivoted construction of the wire and sheath linkage assemblies 120 and 122. When all four of the actuator slides 136, 138 and 166, 168 have contacted either a stop embedded in the two slots 61 aligned with said actuator slides or a control slide 74 or 76, both control slides 74 and 76 are pushed or pulled until their reference lines 116 and 118 are aligned directly above the reference points of said two aligned slots 61. Since control slides 74 and 76 are connected to the rear and front derailleurs 22 and 20 by means of derailleur cable means 32 and 30, respectively, such derailleurs are therefore positioned for the gear (speed) that was selected. When the actuator lever 202 is relaxed, return spring 186 restores actuator slides 136, 138 and 166, 168 and linkage assemblies 120 and 122 to the starting (or non-actuated) position thus allowing a new speed selection to be made as desired.

DETAILED DESCRIPTION OF OPERATION

Figure 10:
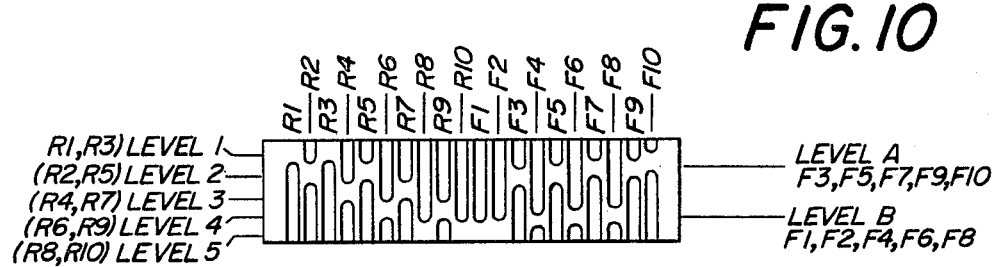
FIG. 10 is a view of the selector shown in FIG. 6 showing the location of the reference points defined thereby.
Figure 11:
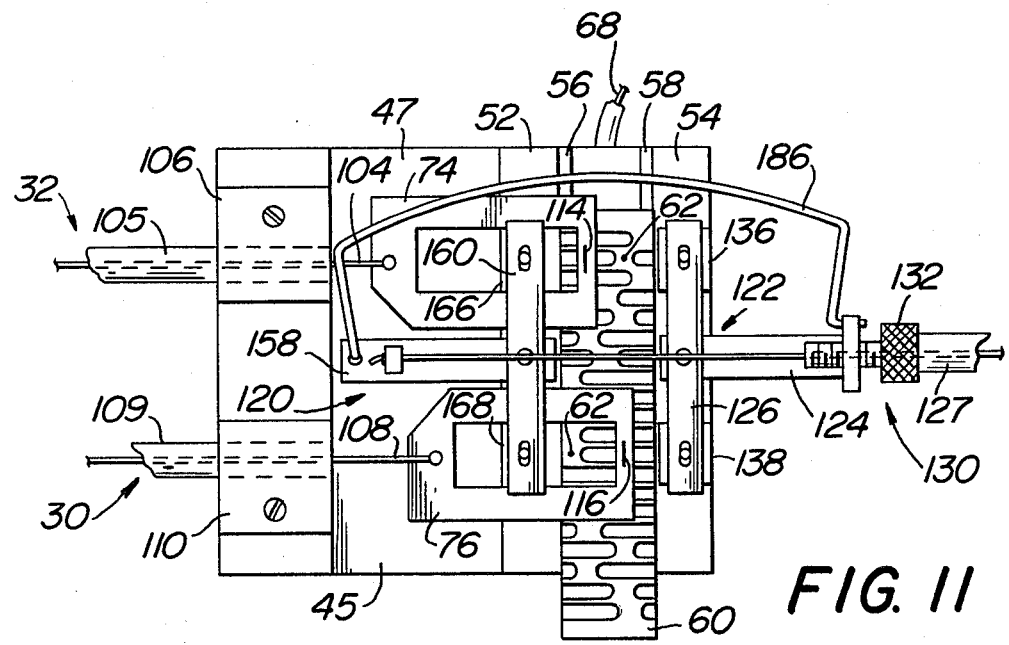
FIGS. 11 and 12 are views showing the non-actuated and actuated positions of the shifter assembly shown in FIG. 2.
Figure 12:
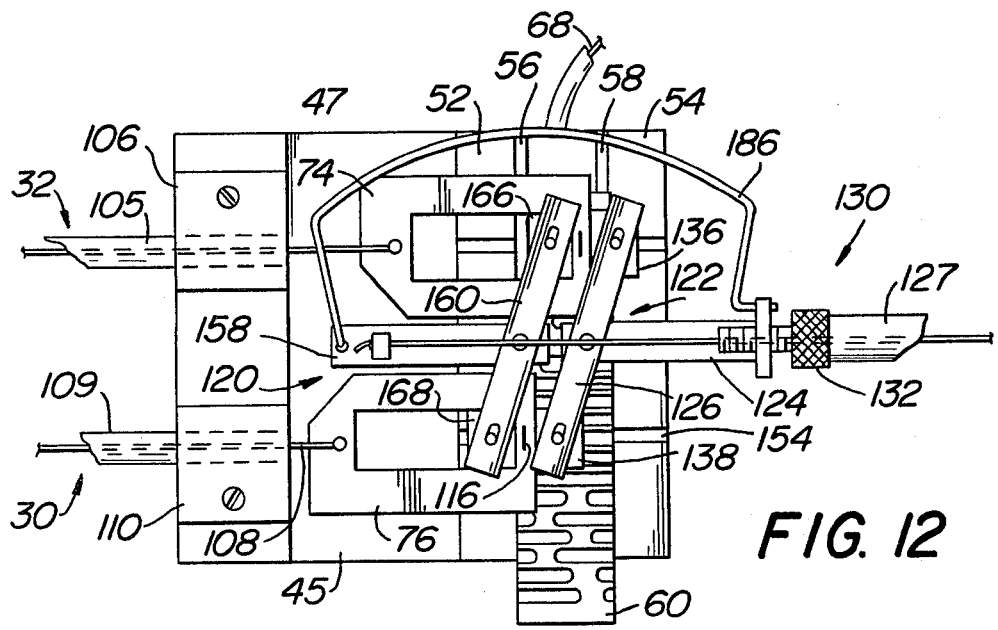

FIGS. 11 and 12 show the device with the side plates and top covers removed to expose the essential moving parts. The following description of a typical gear change from 9th gear to 2nd gear will refer to FIGS. 10, 11 and 12. A gear change is a two stage operation: (1) select the gear; and (2) shift into the selected gear.

In order to understand the overall operation of the gear selection and shifting operations, the relationship between the selector reference points and the positions of the front and rear derailleurs will be described. Referring to FIG. 10, it is noted that the twenty slots 61 of selector member 60 provide two reference points (one for each derailleur) for each of the ten gear ratios of the bicycle.

The position of the reference point within a slot 61 determines the position of the derailleur associated with it. The actuation of the device will cause the reference lines 114 and 116 of control slides 74 and 76, which are coupled to the derailleurs, to be moved into alignment with the reference points indicated by dots 62 for the selected gear. As the actuation of the device can move control slides 74 or 76 in either direction transversely over the entire width of selector member 60, it can be seen that regardless of the previous positions of control slides 74 or 76, actuation of the device will always align control slides 74 and 76 with the selected reference points. Control slide 74 is linked to the rear derailleur which must position chain 24 to any of the five sprockets on the rear sprocket cluster 28. Referring to FIG. 10, the ten reference points indicated at R1-R10 are arranged at five levels indicated at Levels 1-5, each level corresponding to one of the rear sprockets. Level 1 is aligned with reference points defined by the first and third slots from the left, i.e., R1 and R3 on FIG. 10 and corresponds with the 28 tooth rear sprocket. Level 2 is aligned with reference points defined by the second and fifth slots from the left, i.e., R2 and R5, and corresponds to the 24 tooth rear sprocket. Level 3 is aligned with the reference points defined by the fourth and seventh slots from the left, i.e., R4 and R7 in FIG. 10 and corresponds with the 20 tooth rear sprocket. Level 4 is aligned with the reference points defined by the sixth and ninth slots from the left, i.e., R6 and R9 on FIG. 10 and corresponds with the 17 tooth rear sprocket. Level 5 is aligned with the reference points defined by the eighth and tenth slots from the left, i.e., R8 and R10 in FIG. 10 and corresponds with the 14 tooth rear sprocket.

Control slide 76 is linked to the front derailleur which must position chain 24 to either of the two sprockets 25 and 26 of the front sprocket cluster. Referring to FIG. 10 the rightmost ten reference points indicated at F1-F10 fall, in general, on one of two levels, Level "A" or Level "B". Level "A" corresponds to the 52 tooth front sprocket 26 and Level "B" corresponds to the 39 tooth front sprocket 25. Level "A" is aligned with reference points defined by the slots associated with reference points F3, F5, F7, F9 and F10 as shown in FIG. 10, and corresponds with the 52 tooth front sprocket. Level "B" is aligned with the reference points defined by the slots associated with reference points F1, F2, F4, F6, and F8, and corresponds with the 39 tooth front sprocket. The reference points are not exactly aligned on the two levels "A" and "B" due to the need for slight variations in the front derailleur positions to accommodate free passage of chain 24 when it is engaged with the various rear sprockets.

The gear selection process will be described with reference to FIGS. 2 and 3. Movement of control lever 210 of the selector positioning assembly 204 causes motion of the center wire of cable assembly 70, causing a corresponding position change of the shifter selector member 60. Positioning the control lever 210 at "1" will cause selector member 60 of the shifter to be moved to the lowermost selecting position and positioning control lever 210 at "10" will cause selector member 60 to be moved to the uppermost selecting position. When the linkage assemblies 120 and 122 are in the non-actuated position, selector member 60 can be freely moved without affecting the positions of control slides 74 and 76 or the derailleurs in any way. When the device is actuated by the manual pivoting of handle 202, i.e., a shift is in progress, selector member 60 is locked in position by the actuating means and cannot be moved to a new position until handle 202 is relaxed. In general, the gear selection process is accomplished by positioning the control lever 210 of the selector positioning assembly at one of the ten detented positions thus aligning the corresponding two reference points with the actuating means.

Now let us examine the shifting or gear changing process. When handle 202 of the actuator lever mechanism 200 is actuated, wire 128 of the actuator cable assembly 130 is pulled. As was heretofore described, both wire 128 and sheath 126 are used to cause motion in the shifter assembly. Referring to FIGS. 11 and 12, it can be seen that if either of the control slides 74 or 76 are toward the right of the drawing in relationship to the aligned reference points of selector member 60, sheath linkage assembly 122 will push a control slide 74 or 76 into alignment with the associated reference point. If either of the control slides 74 or 76 is toward the left of the drawing in relationship to the aligned reference points of selector member 60, the wire linkage assembly 120 will pull the control slide 74 or 76 into alignment with the associated reference point. Regardless of the gear being shifted into, the same amount of motion is required of the actuator handle 202 and therefore the same amount of relative motion between sheath 127 and wire 128 of cable assembly 130 and of the sheath and wire linkages 120 and 122. Depending upon the particular gear selected, the sheath linkage assembly 122 may exhibit more or less absolute motion than the wire linkage assembly 120, but the relative motion remains constant between them as does the absolute motion of the actuator handle 202. All gear changes therefore require the same operator action with the actuator handle 202. To summarize, actuator handle 202 is actuated, thus causing the sheath and wire linkage assemblies 120 and 122 to push and/to pull the control slides 74 and 76 into alignment with the selected reference points.

A typical gear change is performed as follows. The example chosen is from gear 9 to gear 2.

2. Assume the bicycle is being operated in gear 9. As shown in FIG. 11 control slide 74 is located at Level 4, wherefore drive chain 28 is engaged with the 17 tooth rear sprocket (see Table 1). Also, control slide 76 is located at Level "A" wherefore drive chain 28 is engaged with the 52 tooth front sprocket. Referring to the Table 1, it can be seen that the 17-52 sprocket combination is 9th gear.

2. Next assume the bicycle operator selected gear 2 by moving the control lever 210 of the selector positioning assembly 204 to "2" (FIG. 2). This will cause selector member 60 of the shifter assembly to be positioned as shown in FIG. 11. This does not effect the operation of the bicycle in any way and the bicycle is still being pedaled in gear 9.

3. Next assume the operator squeezes handle 202 of actuator lever mechanism 200 in order to shift into gear 2. FIG. 11 shows the shifter assembly after gear 2 was selected but before the actuator handle 202 is actuated. Note that the selector member reference point for control slide 74 is located two levels to the right of control slide 74 and note that the reference point for control slide 76 is located to the left of control slide 76. FIG. 12 shows the shifter assembly after the actuator handle 202 was operated and before it is relaxed. Note that return spring 186 has been compressed and control slides 74 and 76 are now aligned over the selector member reference points as shown in FIG. 12.

As the actuator handle 202 is actuated, the sheath linkage assembly 122 pushes actuator slides 136 and 138 into the aligned slots 61 until actuator slide 136 is halted by the embedded stop and actuator slide 138 is halted by the control slide 76. At the same time, actuator slide 166 for wire linkage assembly 120 moves into the aligned slots 61 until the actuator slide 166 is halted by control slide 74. Actuator slide 168 can't move into an aligned slot 61 because the stop in the slot 61 is located at the end thereof. Continued movement of the sheath and wire linkages 120 and 122 causes the control slide 74 to be pulled to the right and control slide 76 to be pushed to the left until the shift is completed as shown in FIG. 12. The new positions of control slides 74 and 76 have shifted the front and rear derailleurs 20 and 22 such that chain 28 will shift from the 52 tooth front sprocket to the 39 tooth front sprocket and from the 17 tooth rear sprocket to the 24 tooth rear sprocket. Referring to Table 1, it will be noted that this sprocket combination is gear "2". After the shift is completed, the bicycle operator relaxes the actuator handle 202, allowing return spring 186 to restore the actuating parts to the position shown in FIG. 11. Control slides 74 and 76, of course, remain in their new positions as shown in FIG. 12. The next gear change can now be anticipated and selected at this time.

Figure 8:
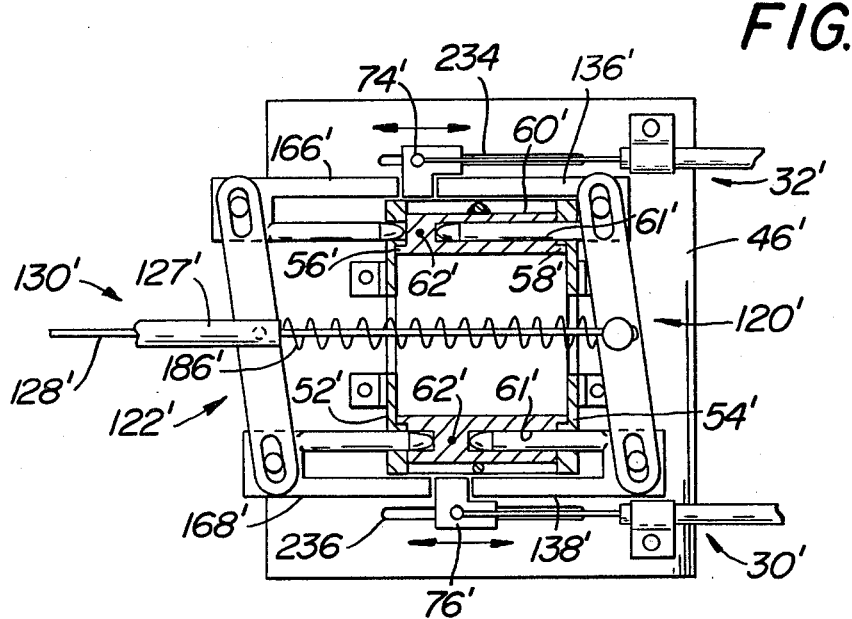
FIG. 8 is a plan view, partly broken away, of a modification of the control means in accordance with the invention.
Figure 9:
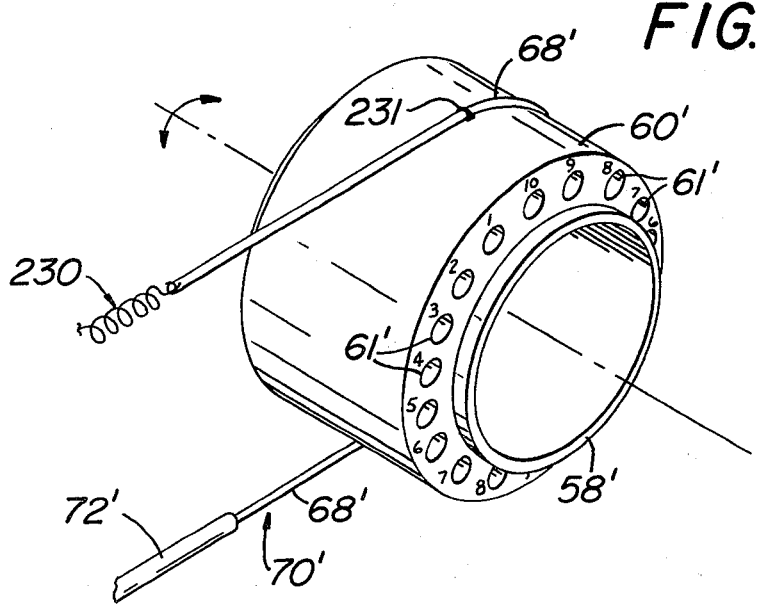
FIG. 9 is a perspective view of a detail of the control means shown in FIG. 8.

In FIGS. 8 and 9 there was shown an embodiment of the invention which is the functional equivalent of that disclosed in FIGS. 1-7, the only essential difference being that the selector is comprised of a cylindrical construction. Accordingly, corresponding parts will be given like reference numerals with primes added.

The selector shown in the embodiment of FIGS. 8 and 9 is indicated at 60' and is comprised of an annular cylindrical construction. Cylindrical selector 60' is provided with twenty reference points that are established by the location of an embedded stop in twenty longitudinally extending holes 61' spaced circumferentially equally around the cylindrical wall of selector 60'. The holes 61' correspond to the slots 61 of the embodiment of FIGS. 1-7 with the embedded stops being located along the extent of the holes 61' at locations corresponding to the embedded stops provided in the slots 61 and thus define twenty reference points 62'. As shown in FIG. 9, there are provided two groups of ten holes 61' with each group being associated with either the front or rear derailleur. In a like manner to that of the FIGS. 1-7 embodiment, there are provided two reference points (one associated with each derailleur) for each of the ten gear ratios (speeds) of the bicycle.

There are provided a pair of selector guides 52' and 54' which support cylindrical selector 60' for rotation about its longitudinal axis to the selecting positions thereof. Selector guides 52' and 54' are secured to a mounting member 46' by suitable mounting brackets and provide circular guideways 56' and 58' facing each other and cooperable with circular rims on selector 60' for guiding the same for rotational movement about the longitudinal axis thereof.

There are provided means for moving selector 60' to various selecting positions by causing a rotational movement thereof. To this end, the wire 68' a selector cable assembly 70' is connected to cylindrical selector 60' at 231 on the periphery thereof and there is provided spring means 230 for biasing the selector 60' in one direction while the wire 68' selector cable assembly 70' moves the same in the opposite direction to a selecting position (FIG. 9). Since the sheath 72' of cable assembly 70' is fixedly secured, the movement of wire 68' of the cable assembly 70' to the left in FIG. 9 causes clockwise rotation of selector 60' while relaxing of the wire 68' permits the spring means 230 to cause a counterclockwise rotation of selector 60' as is apparent from consideration of FIG. 9.

There is also provided control means operatively engaged with front and rear cable means 30' and 32' for positioning the front and rear derailleurs. Such control means comprises a rear control slide 74' and a front control slide 76' constructed and arranged to function in the same manner as the corresponding mechanism in the FIGS. 1-7 embodiment. Control slides 74' and 76' are guided for a generally linear path parallel to holes 61' in selector 60' by means of a pair of slots 234 and 236 formed in mounting member 46' of the mechanism shown in FIGS. 8 and 9.

There is provided an actuating means operatively engageable with control slides 74' and 76' for actuating the same into positions corresponding to the reference points defined by selector 60'. Such means comprises a sheath linkage assembly 122' and a wire linkage assembly 120' which are the functional equivalent of the corresponding parts in the FIGS. 1-7 embodiment. The sheath linkage assembly 122' is connected to a sheath 127' of an actuator cable assembly 130' and wire linkage assembly 120' is connected to wire 128' of actuator cable assembly 130'. There is also provided a compression spring 186' which biases the sheath linkage assembly 120' and the wire linkage assembly 122' to a non-actuated position which permits free rotation of cylindrical selector 60'. The parts are shown in the actuated position in FIG. 8 in which the actuator slides 166', 168', 136' and 138' are shown extended within holes 61'.

It will be apparent that the mechanism shown in FIGS. 8 and 9 operates in essentially the same manner as the FIGS. 1-7 embodiment with the exception that it utilizes a cylindrical selector.

Figure 13:
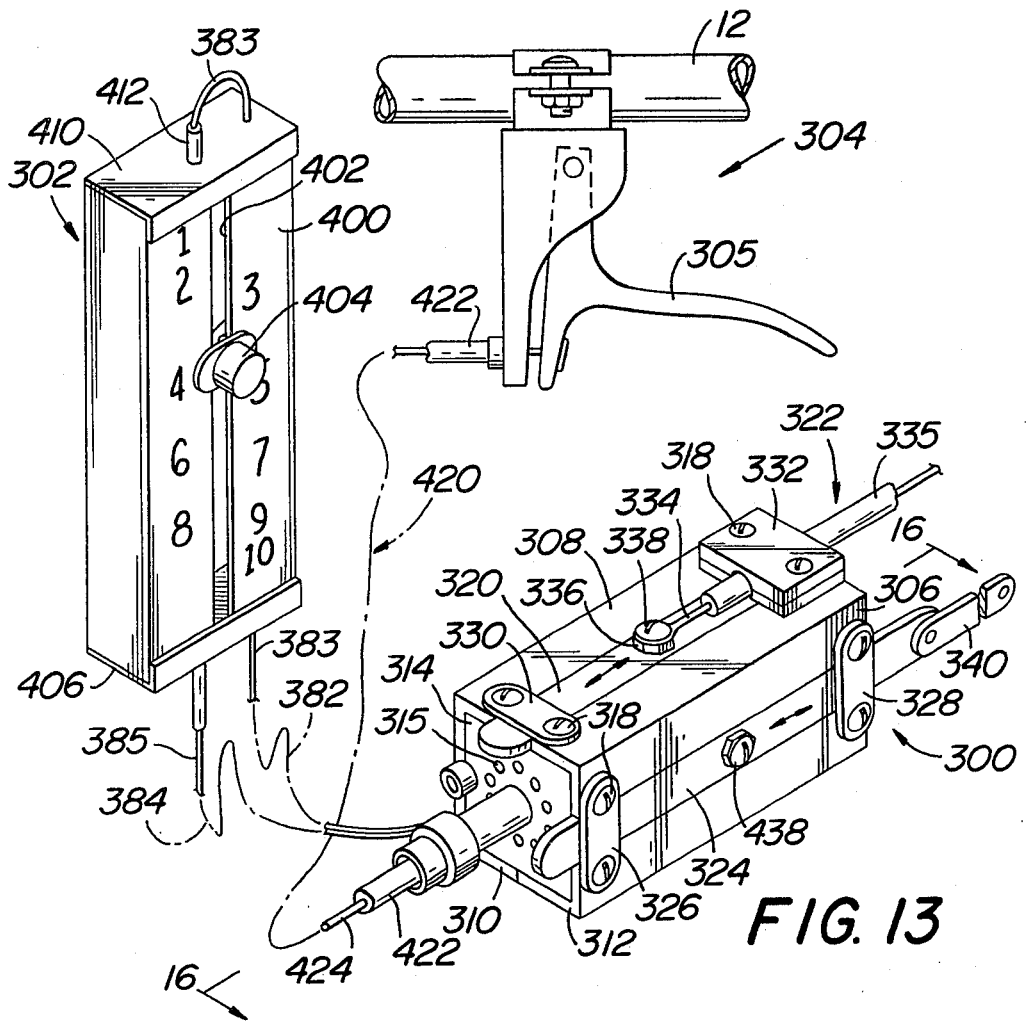
FIG. 13 is a view showing another embodiment of the invention.

In FIGS. 13-21 there is shown another embodiment of the invention, which embodiment has the advantages of compactness and mechanical simplicity. The embodiment of FIGS. 13-19 can be mounted on a ten speed bicycle of the type shown and described with respect to FIG. 1, and, as shown in FIG. 13, is comprised of a shifter assembly 300, a selector positioning assembly 302 and an actuator lever assembly 304. Shifter assembly 300 is mounted by suitable mounting brackets on the frame of the bicycle at a location adjacent to the front derailleur for mechanical connection thereto as will be described hereafter. Selector positioning assembly 302 is mounted by suitable brackets at a central location on the handle bars 12 of the bicycle. Actuator lever mechanism 304 is also mounted on the handle bars 12 of the bicycle at an appropriate location for convenient use thereof.

Shifter assembly 300 is comprised of four angle-shaped frame members 306, 308, 310 and 312 forming a rectangular housing provided with rectangular end plates 314 and 316. Each of the frame members 306-312 is secured to the end plates 314 and 316 by a pair of mounting screws 318 as shown in the Drawing, various of such mounting screws also serving to attach other parts to the mechanism as will be described hereafter.

Shifter assembly 300 includes a rear control slide 320 associated with the rear derailleur cable means 322 and a front control slide 324 associated with the front derailleur as will be described hereafter. Control slides 320 and 324 are mounted on shifter assembly 300 for slidable movement along the length thereof as shown in FIG. 13. Control slide 320 is guided between opposing edges of frame members 306 and 308 and control slide 324 is guided for movement between opposed edges of frame members 306 and 312. A pair of holddown brackets 326 and 328 are constructed and arranged to confine control slide 324 during its longitudinal sliding movement as described above. Brackets 326 and 328 are held in position by mounting screws 318. The control slide 320 is confined in its sliding movement by a holddown bracket 330 secured in position by the mounting screws 318 that secure frame members 308 and 306 to end plate 314 and by a cable clamp 332 secured in position by the mounting screws 318 that secure frame members 306 and 308 to end plate 316 as is apparent from a consideration of FIG. 13.

Control slide 320 is connected to the wire 334 of the rear derailleur cable means 322 by a nut 336 and a fastener 338. The sheath 335 of cable means 322 is clamped in a fixed position by the sheath clamp 332. By this arrangement linear movement of control slide 320 causes a corresponding movement of cable wire 334 which causes the positioning of the rear derailleur to position the drive chain of the bicycle for engagement with a corresponding sprocket.

Control slide 324 is provided with suitable means for connection to the front derailleur actuator. The nature of the connection will depend upon the type of front derailleur present on the bicycle. For example, control slide 324 may be provided with a link 340 constructed and arranged to interconnect the end of control slide 324 to the front derailleur actuator. Of course, various types of connecting means may be employed as is appropriate. Another type of connecting means would be the use of a cable means such as is described with respect to the connection between the rear control slide 320 and the rear derailleur.

By reason of the above-described arrangement, linear movement of the control slides 320 and 324 causes a corresponding actuating motion of the front and rear derailleurs.

In the embodiment of the invention shown in FIGS. 13-19, there is provided means operatively engageable with control slides 320 and 324 for moving the same into positions corresponding to desired shifting positions of the front and rear derailleurs. Such means comprises a selector/actuator assembly 350 which is best shown in FIGS. 14, 15 and 16.

Selector/actuator assembly 350 comprises a pair of selector/actuator members 352 and 354. Selector/actuator member 352 is comprised of a cup-shaped portion having a cylindrical side wall 356 and a circular base 358, and a tubular portion 360 centrally located in base 358. Tubular portion 360 extends in both directions from base 358 with the outwardly extending portion thereof being received in a circular hole 362 in end plate 314 for rotational and sliding movement therein. The inwardly extending portion of tubular portion 360 extends a substantial distance toward end plate 316 for a purpose which will be apparent hereafter.

Selector/actuator member 354 is comprised of a cup-shaped portion having a cylindrical side wall 366 and a circular base 368, and a tubular portion 370 centrally located in base 368. Tubular portion 370 extends in both directions from base 368 with the outwardly extending portion thereof being received in a circular hole 372 in end plate 316 for rotational and sliding movement therein. The inwardly extending portion of tubular portion 370 extends a substantial distance toward end plate 314 to be telescopically received in tubular portion 360.

By this arrangement, selector/actuator members 352 and 354 are guided for rotational movement and for movement toward and away from each other by the bearing supports provided at holes 362 and 372 and between the cooperating surfaces between the overlapping portions of tubular portions 360 and 370.

Selector/actuator member 352 has secured thereto a rod 374 extending axially inwardly from the base 358 thereof toward the base 368 of selector/actuator member 354, the extended end of rod 374 being received in a hole 376 in base 368 of member 354 as best shown in FIG. 16. In a like manner, member 354 has secured thereto a rod 378 extending axially inwardly from the base 368 thereof toward the base 358 of member 352 with the extended end of rod 378 being slidably received in a hole 379 in the base 358 of member 352. By this arrangement, rods 374 and 378 serve to maintain members 352 and 354 in alignment during relative sliding movement toward and away from one another and also serve to insure joint rotation thereof.

Selector/actuator assembly 350 also comprises means for biasing members 352 and 354 to a non-actuated position in which the bases 358 and 368 thereof are located in contact with end plates 314 and 316, respectively. Such means comprises a compression spring 380 extending between the opposed surfaces of the bases 358 and 368 of members 352 and 354, respectively, as best shown in FIG. 16. It will be noted that spring 380 extends around the tubular portions 360 and 370 of members 352 and 354, which portions maintain spring 380 in a straight condition during compression and extension thereof.

Selector/actuator member 352 has a circumferentially extending groove 355 formed in the outer wall of side wall 356 thereof. Groove 355 receives a pair of cords 382 and 384 which are wrapped around side wall 356 in a manner to cause rotation of selector/actuator member 352, which causes conjoint rotation of selector/actuator member 354. To this end, cords 382 and 384 are knotted together at one of their ends inside of side wall 356. Cords 382 and 384 extend outwardly through a radial hole 386 in side wall 356 from which cords 382 and 384 are wrapped around the periphery of side wall 356 in groove 355 in opposite directions in a manner to provide an overlap of approximately 270 degrees. As viewed in FIG. 17, cord 382 extends from hole 386 to be wrapped in a clockwise direction around side wall 356 and to extend tangentially therefrom through a hole 388 in frame member 310. Also, cord 384 extends from hole 386 to be wrapped in a counter-clockwise direction around side wall 356 and to extend tangentially therefrom through a hole 390 in frame member 310. As shown in FIG. 13 cords 382 and 384 extend to the selector positioning assembly 302.

There is provided means for detenting selector/actuator assembly 350 into ten selecting positions. These selecting positions are circumferentially equally spaced around the axis of rotation of selector/actuator assembly 350. To this end, there are provided ten circumferentially spaced recesses 392 (FIG. 18) formed in the outer wall of base 358 of selector/actuator member 352. Recesses 392 correspond to the ten selecting positions of the selector/actuator assembly 350. The detent mechanism also comprises a spring biased ball 394 mounted in a tube 396 in end plate 314 as best shown in FIGS. 14 and 15. Ball 394 is aligned with the path of rotation of recesses 392 and is adapted to be received therein for precisely positioning member 352 at a selecting position. By this arrangement ball 394 cooperates with the recesses 392 in a conventional detenting operation to precisely position the selector/actuator assembly 350 in each of the ten selecting positions to which it has been rotated by cords 382 and 384 as will be described more fully hereafter.

Figure 19:
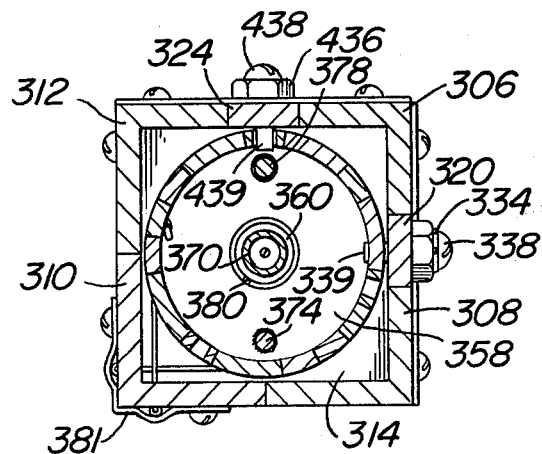
FIG. 19 is a section taken on line 19—19 of FIG. 15.
Figure 21:
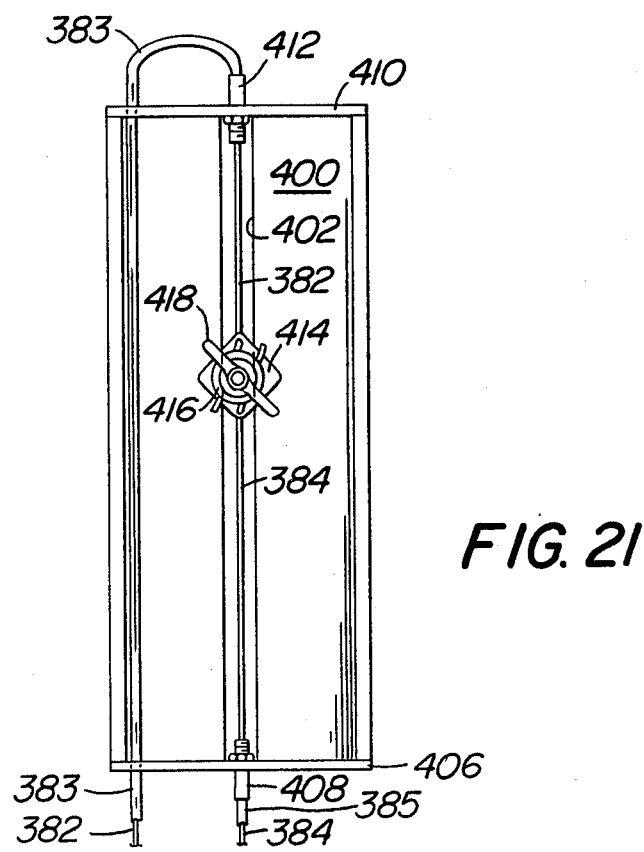
FIG. 21 is a back view of the selector positioning assembly shown in FIG. 13.

Selector positioning assembly 302 comprises a rectangular housing including a front plate 400 having a slot 402 formed therein. A control knob 404 is constructed and arranged to be slidably received in slot 402 for movement between ten control positions indicated on the face of front plate 400 by numbered indicia as shown in FIG. 13. Cords 382 and 384 are contained within sheaths 383 and 385 which are fixedly connected at their ends to frame member 310 and to the housing of selector positioning assembly 302. Sheaths 383 and 385 are clamped into position on frame member 310 by clamping bracket 381 as shown in FIG. 19. Sheath 385 is secured in a fixed position at a bottom plate 406 of the selector positioning assembly housing by means of a sheath connector 408. Sheath 383 extends through bottom plate 406 for a fixed connection to a top plate 410 of the selector positioning assembly housing by a sheath connector 412 (see FIG. 21). Cord 384 extends upwardly from sheath connector 408 for connection at its end to control knob 404 and cord 382 extends downwardly from sheath connector 412 for connection to control knob 404. The ends of cords 382 and 384 extend through holes in a connector member 414 and are secured into position between connector member 414 and a washer 416 by means of a wing nut 418 as best shown in FIG. 21.

By this arrangement, the upward movement of control knob 404, as viewed in FIG. 13, will cause a corresponding movement of cords 382 and 384 which will cause rotation of member 352 in one direction, ie., clockwise as viewed in FIG. 18. Also, downward movement of control knob 404, as viewed in FIG. 13, will cause a corresponding movement of cords 382 and 384 to cause rotation of member 352 in the other direction, ie., counterclockwise as viewed in FIG. 18. As described above, the rotational movement of member 352 will cause a conjoint rotational movement of member 354 and the entire selector/actuator assembly 350.

The parts are constructed so that the movement of control knob 404 between the ten control positions shown in FIG. 13 will cause corresponding rotation of the selector/actuator assembly 350 to the ten selecting positions thereof.

Selector/actuator assembly 350 defines reference points which are equivalent of the reference points defined by selector 60 of the embodiment shown in FIGS. 1-7. Accordingly, there are provided two reference points (one associated with each derailleur) for each of the ten speeds of the bicycle.

The reference points on selector/actuator assembly 350 are defined by the center of twenty holes formed by side walls 356 and 366 of selector/actuator members 352 and 354. When such members are in their actuated or closed position as shown in FIG. 15, the holes, indicated at 401, are formed by half circles in opposing edge portions of side walls 356 and 366 and are circumferentially equally spaced (18° apart) around the circumference of side walls 356 and 366.

Figure 20:
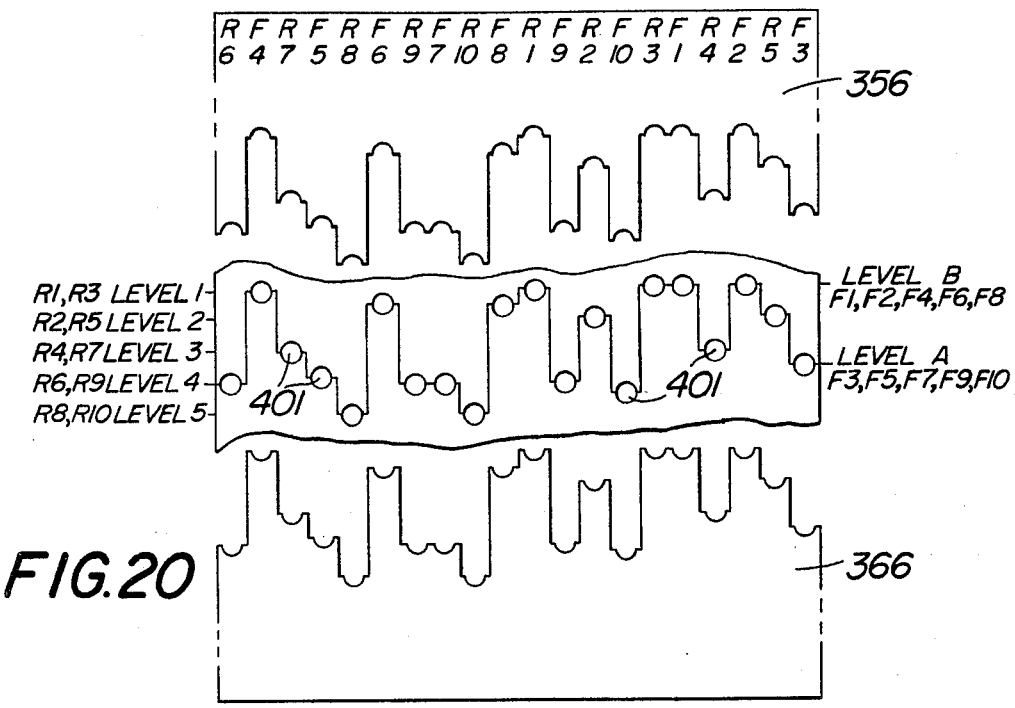
FIG. 20 is a layout view of a detail of the shifter assembly of FIG. 13.

The location of the reference points along the axial extent of side walls 356 and 366 is shown in FIG. 20 which is a layout view of the cylindrical side walls 356 and 366 shown in a spaced apart or non-actuated position and in a closed or actuated position. In FIG. 20, the ten reference points associated with the front derailleur are indicated at F1-F10 and the ten reference points associated with the rear derailleur are indicated at R1-R10 which corresponds to the showing in FIG. 10. Also, from a comparison of FIG. 20 with FIG. 10, it can be seen that the reference points F1-F10 and R1-R10 of selector/actuator assembly 350 have locations on levels 1-5 and levels "A" and "B" corresponding to the locations of the reference points of selector 60. For example, the reference points defined at R1 and R3 are located at level 1, the reference points defined by F1, F2, F4, F6, F8 are located at level "B", etc., the reference points being located in the manner described above with respect to FIG. 10. Also, the reference points located on levels 1, 2, 3, 4 and 5 correspond with the same rear sprockets described with reference to FIG. 10. Further, level "A" corresponds to the 52 tooth front sprocket and level "B" corresponds to the 39 tooth front sprocket as is the case with the showing in FIG. 10. As described above with respect to FIG. 10, the reference points F1-F10 are not exactly at the two levels "A" and "B" due to the need for slight variation in the front derailleur position to accommodate free passage of the chain when it is engaged with various rear sprockets.

As is apparent from FIG. 20, the design is such that the front derailleur reference points F1-F10 and the rear derailleur reference points R1-R10 are alternated with $R_N$ being displaced ninety degrees from $F_N$. The reference points are alternated in order to accommodate a full rotation of selector/actuator assembly 350 for selection purposes. The reference points are displaced ninety degrees in order to conform with the position of the control slides 320 and 324 which are displaced ninety degrees.

The selector positioning assembly 302, by movement of control knob 404 between the ten control positions thereof, in cooperation with the detent mechanism operates to position the selector/actuator assembly 350 rotationally in ten selecting positions corresponding to the ten speeds of the bicycle. In each of these selecting positions, the side wall cutouts forming one of the front derailleur reference points F1-F10 is aligned with the front control slide 324 and the side wall cutouts forming a corresponding rear reference point R1-R10 are aligned with the rear control slide 320. In other words, for example, if speed number "1" is selected by selector positioning assembly 302, the sidewall cutouts defining reference point F1 are aligned with control slide 324 and the side wall cutouts defining reference point R1 are aligned with control slide 320, etc.

Means are provided for actuating control slides 320 and 324 into positions corresponding to the reference points of the selector/actuator assembly 350. Such means causes a shifting movement of control slides 320 and 324 to control positions thereof to cause a corresponding movement of the front and rear derailleur control means to place the front and rear derailleurs in a desired shifting position. To this end, an actuator cable assembly 420, comprised of a sheath 422 and a wire 424, is operatively connected to actuator lever assembly 304. Lever assembly 304 is comprised of a pivoted handle 305 having one end of wire 424 connected thereto (FIG. 13). The associated end of sheath 422 is fixed to a bracket 303 mounted on handlebar 12 (FIG. 13). In use, a pivoting movement of handle 305 causes a relative converging movement between the other ends 430 and 423 of wire 424 and sheath 422, respectively, which are connected to the selector/actuator assembly 350 as will be described hereafter.

As best shown in FIG. 16, the metal end 423 of sheath 422 is received in a recess in the head end of a conventional connector 426 which threadedly engages a centering stop 428 and extends therethrough into the outer end of tube 360. By this arrangement, as sheath 422 is caused to move toward end plate 314 it will cause a corresponding movement of tube 360. This movement toward end plate 314 will be stopped by contact of the centering stop 428 with the outer face of end plate 314, this position being shown in FIG. 15.

Wire 424 extends from the end of sheath 422 through a central hole in connector 426 and through the interior of tubes 360 and 370 for connection with an end step 430 located outside of tube 370 as shown in FIG. 16. Wire 424 also extends through a central opening in a centering stop 432 provided with a recess adapted to receive the end stop 430. Centering stop 432 has a portion extending into the outer end of tube 370 for securing the centering stop 432 in position at this outer end. As the end 430 of wire 422 is moved toward the end plate 316, this movement is terminated when centering stop 432 comes into contact with the outer face of end plate 316, this position being shown in FIG. 15.

It will be apparent that the converging movement of the ends 423 and 430 of sheath 422 and wire 424, respectively, from the non-actuated position, shown in FIGS. 14 and 16, to the actuated position, shown in FIG. 15, will cause a corresponding movement of the selector/actuator members 352 and 354 from the spaced apart (non-actuated) position of FIG. 14 to the closed (actuated) position of FIG. 15 in which the reference point defining holes 401 are formed.

Means are provided for aligning the selector/actuator assembly 350 in the ten selecting/actuating positions thereof during the actuating movement thereof. To this end, end plate 314 is provided with ten circumferentially equally spaced alignment holes 315. Holes 315 are located to be aligned with the circular rotating path of the rod 378 and are adapted to slidably receive rod 378 therein. In a like manner, end plate 316 is provided with ten circumferentially equally spaced holes 317 aligned with the rotating path of rod 374 and are adapted to slidably receive rod 374 therein. Also, holes 317 are aligned with the holes 315. The sliding fit between holes 315 and rod 378 and between holes 317 and rod 374 are such that the members 352 and 354 are precisely aligned in the selector/actuating positions during an actuating movement. In order to insure proper entry of rods 374 and 478 in holes 317 and 315, respectively, the cooperating ends of rods 374, 378 and holes 317 and 315 are bevelled as is shown in FIG. 16.

Each of the actuator slides 320 and 324 is provided with means operatively engaged by the selector/actuator assembly for positioning the control slides 320 and 324 in the control positions thereof. To this end, fastener 338 has its end 339 extending from the bottom wall of slide 320 a distance so as to be positioned between the side walls 356 and 366 of members 352 and 354 so that this end 339 will extend within the reference point defining holes 401 in side walls 356 and 366 as is shown in FIG. 15.

In a like manner, slide 324 is provided with a nut 436 threadedly engaged with the upper threaded portion of a fastener 428, with the lower end 439 of fastener 438 extending downardly from the bottom of control slide 324 a distance so as to extend within the reference point defining holes 401 in the same manner as end 339 of fastener 338.

OPERATION OF EMBODIMENT SHOWN IN FIGS. 13-21

In the first step of a gear shifting operation, selector/actuator assembly 350 is positioned to one of the ten selecting positions thereof by operating the selector positioning assembly 302. In this first step, the operator simply moves control knob 404 to the desired selecting position corresponding to the speed at which he wishes to operate the bicycle as described in detail above. The movement of control knob 404 causes a rotating movement of the selector/actuator member 352 and a conjoint movement of member 354 to one of the ten selecting positions. This will place the proper cutouts in the side walls 356 and 366 of members 352 and 354 is alignment with the ends 339 and 439 of the control slides 320 and 324 for the selected speed.

The next step in a gear shifting operation is the actuating step in which the operator operates handle 305 of lever mechanism 304. This actuating movement causes the ends 423 and 430 of the sheath 422 and wire 424 to be converged to move the selector/actuator assembly 350 from the non-actuated position shown in FIG. 14 to the actuated position shown in FIG. 15. This actuating movement causes the selector/actuator members 352 and 354 to engage fastener ends 339 and 439 to cause the control slides 320 and 324 to move to the desired control position corresponding to the selected speed. The converging movement of selector/actuator members 352 and 354 will also cause compression of spring 380. Since control slides 320 and 324 are connected to the rear and front derailleurs of the bicycle, such derailleurs will be positioned for the gear (speed) that was selected. When actuator lever 305 is relaxed, return spring 380 expands to restore the selector/actuator members 352 and 354 to the starting (or non-actuated) position shown in FIG. 14. This will allow a new speed selection to be made, as desired.

It will be noted that when the selector/actuator members 352 and 354 are moved together, rods 374 and 378 extend within an aligned hole 317 and 315 in end plates 314 and 316 to thereby prevent any rotating movement ie., when a shift is in progress. By reason of the construction involving the cooperation between the centering stops 428 and 432 and the end plates 314 and 316, the selector/actuator members 352 and 354 will always be moved to the same actuated position shown in FIG. 14. In the arrangement shown in the Drawings, in the movement from the non-actuated position of FIG. 14 to the actuated position of FIG. 15, members 352 and 354 move the same amount. As members 352 and 354 move together to the actuated position, they push or pull the control slides 320 and 324 into alignment with the two selected reference points.

The sequential or stopped partial shifting feature of the invention will be described with reference to the embodiment shown in FIGS. 13-21. In order to facilitate stepped partial shifting, selector positioning assembly 302 has gears 1, 2, 4, 6 and 8 marked on the left side of the selector, such gears being the five low range gears teach engages the small front sprocket with a different rear sprocket). Also, gears 3, 5, 7, 9 and 10 are marked on the right side of the selector and are the five high range gears (each engages the large front sprocket with a different rear sprocket).

Complete actuation of the shifting means while pedaling the bike will cause a shift into the selected gear.

Sequential or stepped partial shifts are also possible and allow several successive up shifts or down shifts without the need for intervening gear selections for each gear into which the bicycle is shifted. For example, let us assume the bicycle is being operated in 8th gear and the operator notes that he is approaching a long, steep upgrade. In order to avoid several successive select-shift-select sequences that would be required for the hill climb, he can initially select gear 1. Then, as the bicycle begins to slow, partial actuation shifts the bicycle to gear 6, additional actuation to gear 4, and still further actuation to gear 2, to thereby provide a very smooth series of down shifts for the hill climb without having to bother with any additional selection during the hill climb. Should the bike have crested the hill in gear 2, the bicycle operator can now select a higher gear even though the bicycle was never shifted all the way into the last selected gear 1.

What is claimed is:

1. In a dual shift bicycle having a plurality of drive gears and including a frame, a drive chain, a front sprocket cluster including a plurality of sprockets, a front derailleur associated with the front sprocket cluster and movable to positions for shifting the drive chain into engagement with the sprockets thereof, a rear sprocket cluster including a plurality of sprockets, a rear derailleur associated with said rear sprocket cluster and movable to positions for shifting the drive chain into engagement with the sprockets thereof, a front derailleur shift means operatively connected at one end to the front derailleur and movable for positioning the front derailleur, and rear derailleur shift means operatively connected at one end to the rear derailleur and movable for positioning the rear derailleur, the improvement comprising:

means for shifting between the gears on said dual shift bicycle by moving the front and rear derailleur shift means to position said front and rear derailleurs, including control means including a front control member operatively engaged with said front derailleur shift means and movable through shifting movements between a plurality of control positions and a rear control member operatively engaged with said rear derailleur shift means and movable through shifting movements between a plurality of control positions, means for selecting for each of said front and rear control members a selected control position to which said front and rear control members are to be moved in a rear shifting movement from a present control position to a selected control position, and means operatively engageable with said front and rear control members for actuating the same through said shifting movement with said front and rear control members being positioned together in accordance with two selected control positions of the selecting means when said actuating means is actuated, said selecting means being operable independently of said actuating means so that the shifting between the gears of said dual shift bicycle is performed in two sequential operations, the first operation being the selection of a desired new gear and the second operation being the actual shifting into said selected gear.

2. A dual shift bicycle according to claim 1 wherein said selecting means comprises a selector member providing a first set of reference points corresponding to the control positions of said front control member and a second set of reference points corresponding to the control positions of said rear control member.

3. A dual shift bicycle according to claim 2 wherein said selector member comprises a slide having a plurality of slots formed therein, each slot corresponding to one of said reference points and having a stop embedded therein defining said reference point.

4. A dual shift bicycle according to claim 2 wherein said selector member comprises a cylindrical construction having a plurality of longitudinally extending holes spaced circumferentially around a cylindrical wall, each hole corresponding to one of said reference points and having a stop embedded therein defining said reference point.

5. A dual shift bicycle according to claim 2 including means for detenting the selector member at the various selecting positions.

6. A dual shift bicycle according to claim 2 wherein said selecting means includes a cable means engaged with said selector member and positioned at a location remote from said selector member, and manually operable means at said remote location engaged with said cable means for moving the same to cause a selecting movement of said selector member.

7. A dual shift bicycle according to claim 1 including motion transmitting means on said control members adapted to be engaged by said actuator means to be placed in alignment with said control positions and derailleur connecting means on said control members adapted to transmit the motion of said control members to said derailleurs.

8. A dual shift bicycle according to claim 1 wherein said actuator means comprises actuator members adapted to engage said control members for alignment to said control positions during actuation and being movable between said actuated position and a non-actuated position out of engagement with said control members.

9. A dual shift bicycle according to claim 8 wherein said actuator means comprises an actuator cable assembly including a wire and sheath and means for moving corresponding ends of said wire and sheath relative to one another, said wire and sheath being engaged at one of their ends with said actuator members whereby said actuator members are remotely actuated.

10. A dual shift bicycle according to claim 8 including means for biasing said actuator means to said non-actuated position.

11. A dual shift bicycle according to claim 1 wherein said selector means and said actuator means are combined and include a pair of selector/actuator members, each of which is provided with reference point defining means, said reference point defining means facing each other in an aligned relationship to define between opposed portions thereof a plurality of reference points corresponding to the control positions of said front and rear control members, said reference point defining means being constructed to engage said control member for positioning to said control positions during actuation.

12. A dual shift bicycle according to claim 11 including means for mounting said selector/actuator members for conjoint selecting movement and for movement toward and away from each other between a spaced apart non-actuated position and a closed actuated position.

13. A dual shift bicycle according to claim 1 wherein said actuator means is movable between a non-actuated position out of engagement with said control members to permit a selecting operation of said selecting means and an actuated position in engagement with said control members whereby said selecting means is interlocked to prevent a selecting operation.

14. A dual shift bicycle according to claim 3 wherein said actuator means is movable between a non-actuated position out of engagement with said slots to permit a selecting operation of said selecting means and an actuated position within said slots whereby said selecting member is interlocked to prevent a selecting operation.

15. A dual shift bicycle according to claim 14 wherein said actuator means comprises an actuator cable assembly including a wire and a sheath and means for moving said wire and said sheath relative to one another, a sheath linkage assembly engaged with said sheath and a wire linkage assembly engaged with said wire, said sheath and wire linkage assemblies being operatively engageable with said front and rear control members and being movable between said non-actuated and actuated positions.

16. A dual shift bicycle according to claim 15 including means for biasing said sheath and wire linkage assemblies to said non-actuated position.

17. A dual shift bicycle according to claim 3 wherein said selecting means includes a cable means engaged with said selector member and positioned at a location remote from said selector member, and manually operable means at said remote location engaged with said cable means for moving the same to cause a selecting movement of said selector member.

18. A dual shift bicycle according to claim 17 wherein said manually operable means comprises a control lever and detent means for detenting the various positions of said control lever.

19. In a dual shift bicycle having a plurality of drive gears and including a frame, a drive chain, a front sprocket cluster including a plurality of sprockets, a front derailleur associated with the front sprocket cluster and movable to positions for shifting the drive chain into engagement with the sprockets thereof, a rear sprocket cluster including a plurality of sprockets, a rear derailleur associated with said rear sprocket cluster and movable to positions for shifting the drive chain into engagement with the sprockets thereof, a front derailleur shift means operatively connected at one end to the front derailleur and movable for positioning the front derailleur, and rear derailleur shift means operatively connected at one end to the rear derailleur and movable for positioning the rear derailleur, the improvement comprising:

means for shifting between the gears on said dual shift bicycle by moving the front and rear derailleur shift means to position said front and rear derailleurs, including control means including a front control member operatively engaged with said front derailleur shift means and movable through shifting movements between a plurality of control positions and a rear control member operatively engaged with said rear derailleur shift means and movable through shifting movements between a plurality of control positions, selector/actuator means for selecting for each of said front and rear control members a selected control position to which said front and rear control members are to be moved in a gear shifting movement from a present control position to a selected control position and engageable with said front and rear control members for actuating the same through said shifting movement, said control position selection operation being independent of said actuation of said control members through said shifting movement so that the shifting between the gears of said dual shift bicycle is performed in two sequential operations, the first operation being the selection of a desired new gear and the second operation being the actual shifting into said selected gear.

20. A dual shift bicycle according to claim 19 wherein said selector/actuator means included a pair of selector/actuator members each of which is provided with reference point defining means, said reference point defining means facing each other in an aligned relationship to define between opposed portions thereof a plurality of reference points corresponding to the control positions of said front and rear control members.

21. A dual shift bicycle according to claim 20 including motion transmitting means on said control members adapted to the engaged by said selector/actuator members to be placed in alignment with said reference points.

22. A dual shift bicycle according to claim 21 including means mounting said selector/actuator members for conjoint selecting movement and for movement toward and away from each other between a spaced apart non-actuated position and a closed actuated position.

23. A dual shift bicycle according to claim 20 wherein said selector/actuator members have generally cylindrical side walls, said reference point defining means comprising cutouts located circumferentially around said side walls at various axial positions.

24. A dual shift bicycle according to claim 23 wherein said motion transmitting means are out of engagement with said selector/actuator members in said non-actuated position thereof to permit a selecting operation in which said selector/actuator members are rotated, and said motion transmitting means are in engagement with said selector/actuator members in said actuated position to interlock the same to prevent a rotating selecting operation.

25. A dual shift bicycle according to claim 20 wherein said selector/actuator means comprises an actuator cable assembly including a wire and a sheath and means for moving adjacent ends of said wire and said sheath relative to one another, a sheath motion transmitting means engaged with said sheath end and a wire motion transmitting means engaged with said wire end, said sheath and wire motion transmitting means being operatively engageable with said front and rear control members and being movable between said non-actuated and actuated positions.

26. A dual shift bicycle according to claim 22 including means for biasing said selector/actuator members to said non-actuated position.

27. A dual shift bicycle according to claim 20 wherein said selector/actuator means includes a cable means engaged with said selector/actuator members and positioned at a location remote therefrom, and manually operable means for moving the same to cause a rotating selecting movement of said selector/actuator members.

28. A dual shift bicycle according to claim 27 wherein said manually operable means comprises a control handle and detent means for detenting the various selecting positions.

29. A dual shift bicycle according to claim 22 including means for aligning said selector/actuator members in the selecting positions during the actuating movement thereof.

30. A dual shift bicycle according to claim 29 wherein said aligning means includes a rod carried by each of said selector/actuator members and frame means providing a plurality of circumferentially spaced openings adapted to receive said rods during an actuating movement.

* * * * *